us010205568B2

United States Patent
Byun et al.

(10) Patent No.: US 10,205,568 B2
(45) Date of Patent: Feb. 12, 2019

(54) METHOD AND DEVICE FOR GENERATING INTER-CELL INFORMATION FOR CANCELLING INTER-CELL INTERFERENCE

(71) Applicant: LG ELECTRONICS INC., Seoul (KR)

(72) Inventors: Ilmu Byun, Seoul (KR); Heejeong Cho, Seoul (KR); Hyunsoo Ko, Seoul (KR); Hyeyoung Choi, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/519,377

(22) PCT Filed: Jan. 16, 2015

(86) PCT No.: PCT/KR2015/000463
§ 371 (c)(1),
(2) Date: Apr. 14, 2017

(87) PCT Pub. No.: WO2016/060336
PCT Pub. Date: Apr. 21, 2016

(65) Prior Publication Data
US 2017/0230152 A1    Aug. 10, 2017

Related U.S. Application Data

(60) Provisional application No. 62/065,604, filed on Oct. 17, 2014.

(51) Int. Cl.
*H04L 5/00*    (2006.01)
*H04B 7/024*    (2017.01)
(Continued)

(52) U.S. Cl.
CPC ........... *H04L 5/0032* (2013.01); *H04B 7/024* (2013.01); *H04B 7/0456* (2013.01);
(Continued)

(58) Field of Classification Search
CPC .... H04L 5/0032–5/0035; H04L 1/0078; H04L 1/009–1/0091; H04W 28/04;
(Continued)

(56) References Cited

U.S. PATENT DOCUMENTS

2013/0070723 A1    3/2013    Yie et al.
2014/0342745 A1*   11/2014   Bhushan ........... H04W 28/0289
                                                           455/450
(Continued)

FOREIGN PATENT DOCUMENTS

KR    10-2009-0103671 A    10/2009
KR    10-2012-0047774 A    5/2012
KR    10-2013-0143005 A    12/2013

OTHER PUBLICATIONS

Alcatel-Lucent, "UE PMI feedback signalling for user pairing/coordination", R1-090777, 3GPP TSG RAN WG1 #56 Meeting, Athens, Greece, Feb. 9-13, 2009, 6 pgs.

*Primary Examiner* — Eric Myers
(74) *Attorney, Agent, or Firm* — Birch, Stewart, Kolasch & Birch, LLP

(57) ABSTRACT

Provided is a method for transmitting and receiving inter-cell information for cancelling inter-cell interference in a wireless communication system. The method for transmitting and receiving inter-cell information may comprise the steps in which: a base station of a victim cell transmits, to a base station of an adjacent aggressor cell, a first PMI set which is a set of PMIs of a signal corresponding to an area partitioned in a predetermined direction; the base station of the aggressor cell transmits, to the victim cell, the signal of the PMIs by using a specific resource; the base station of the
(Continued)

victim cell receives, from a terminal in the victim cell, a feedback signal on the signal of the PMIs; the base station of the victim cell transmits, to the base station of the aggressor cell, the feedback information; and the base station of the aggressor cell updates the first PMI set to a second PMI set on the basis of the feedback information, and transmits, to the base station of the victim cell, the updated second PMI set.

6 Claims, 7 Drawing Sheets

(51) Int. Cl.
*H04J 11/00* (2006.01)
*H04W 28/04* (2009.01)
*H04W 52/34* (2009.01)
*H04B 7/0456* (2017.01)

(52) U.S. Cl.
CPC ............ *H04J 11/005* (2013.01); *H04L 5/005* (2013.01); *H04L 5/0035* (2013.01); *H04L 5/0057* (2013.01); *H04L 5/0073* (2013.01); *H04W 28/04* (2013.01); *H04W 52/343* (2013.01)

(58) Field of Classification Search
CPC ... H04B 7/0417; H04B 7/0456–7/0482; H04B 7/0491–7/0495; H04B 7/0639
See application file for complete search history.

(56) References Cited

U.S. PATENT DOCUMENTS

2015/0333807 A1* 11/2015 Saiwai ................ H04B 7/0456
                                                               375/267
2016/0211954 A1* 7/2016 Goransson ............ H04B 7/024

\* cited by examiner

METHOD AND DEVICE FOR GENERATING INTER-CELL INFORMATION FOR CANCELLING INTER-CELL INTERFERENCE

CROSS REFERENCE TO RELATED APPLICATIONS

This application is the National Phase of PCT International Application No. PCT/KR2015/000463, filed on Jan. 16, 2015, which claims priority under 35 U.S.C. 119(e) to U.S. Provisional Application No. 62/065,604, filed on Oct. 17, 2014, all of which are hereby expressly incorporated by reference into the present application.

BACKGROUND OF THE INVENTION

Field of the Invention

The present invention relates to a method and apparatus for generating inter-cell information for removing inter-cell interference, more particularly, to a method and apparatus for generating inter-cell information for removing inter-cell interference in a massive MIMO system.

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Owing to the advent of such a high-quality service, needs for wireless communication service have been abruptly increased. In order to actively cope with such a situation, more than anything else, the capacity of the communication system should be increased. The way for increasing the communication capacity in the wireless communication environment may include a method for newly finding available frequency band and a method for increasing efficiency for the limited resource.

As a method for increasing efficiency of the limited resource, a technique for increasing a transmission capacity, so-called the multiple antenna transmission and reception technique has been vigorously developed with a great attention, which takes a diversity gain by additionally securing the spatial area for the resource utilization by mounting multiple antennas on a transceiver or increases a transmission capacity by transmitting data in parallel through each antenna.

In the multiple antenna system, the beamforming and the precoding may be used for increasing the Signal to Noise Ratio (SNR). In the closed-loop system that may use feedback information in a transmission end, the beamforming and the precoding are used for maximizing the SNR through the corresponding feedback information.

SUMMARY OF THE INVENTION

An aspect of the present invention is to propose a method and apparatus for generating inter-cell information for performing inter-cell interference removal in a massive MIMO communication system within a small cell.

An aspect of the present invention is to propose a method and apparatus for generating PMI information between a base station of a cell that undergoes interference and a base station of a cell that causes interference so as to perform inter-cell interference removal in a massive MIMO communication system within a small cell.

A method for generating inter-cell information according to the present invention may include transmitting, by a base station of a victim cell, a first PMI set, which is a set of PMIs of a signal corresponding to divided areas in a predetermined direction, to a base station of an aggressor cell; transmitting, by the base station of the aggressor cell, a signal for the PMI to the victim cell using a specific resource; receiving, by the base station of the victim cell, a feedback signal for the signal for the PMI from a wireless device within the victim cell; transmitting, by the base station of the victim cell, the feedback information to the base station of the aggressor cell, and updating, by the base station of the aggressor cell, the first PMI set to a second PMI set based on the feedback information, and transmitting the updated second PMI set to the base station of the victim cell.

ADVANTAGEOUS EFFECTS

According to an aspect of the present invention, it is proposed a method and apparatus for generating inter-cell information for performing inter-cell interference removal in a massive MIMO communication system.

According to an aspect of the present invention, it is proposed a method and apparatus for generating PMI information between a base station of a cell that undergoes interference and a base station of a cell that causes interference so as to perform inter-cell interference removal in a massive MIMO communication system.

DESCRIPTION OF EXEMPLARY EMBODIMENTS

The present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

Figure 1:
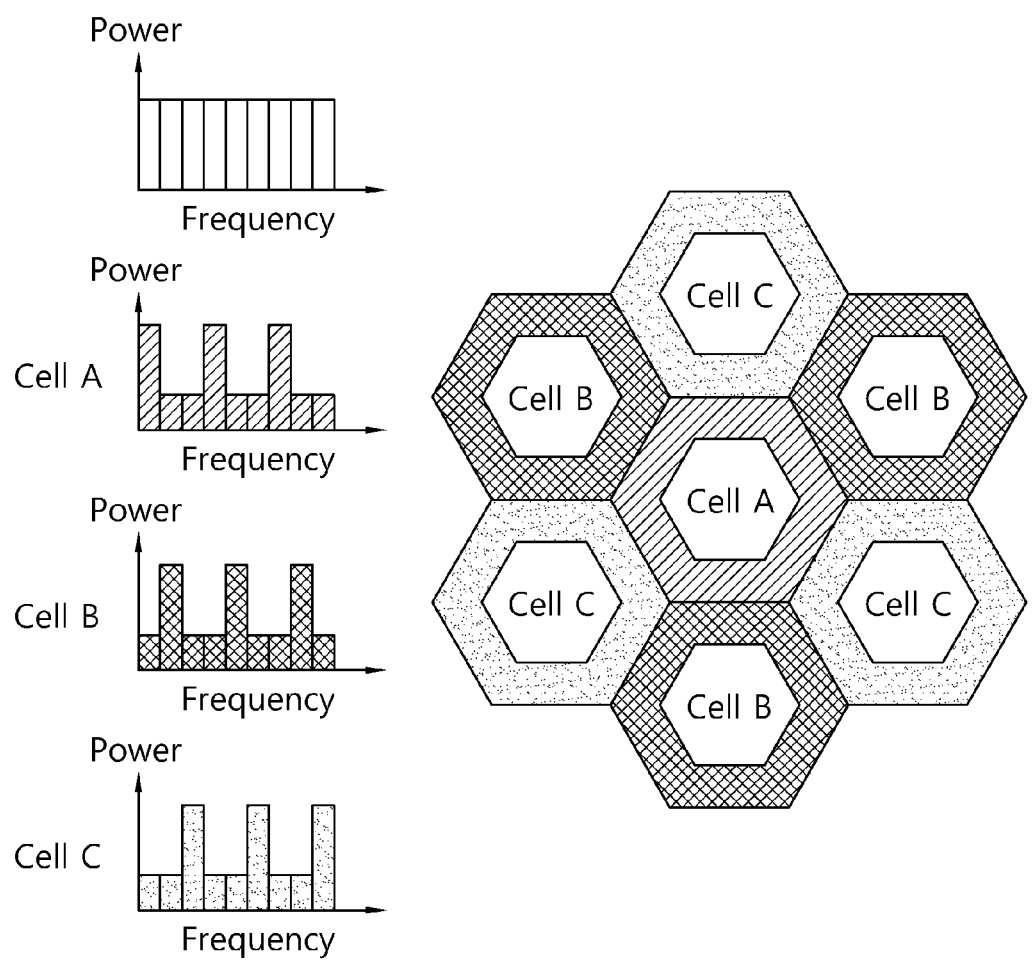
FIG. 1 is a diagram for describing the inter-cell interference coordination in the LTE system.

FIG. 1 is a diagram for describing the inter-cell interference coordination in the LTE system.

In the LTE system, each cell may be divided into interior and exterior. In the interior cell in which a user undergoes interference of low level and low power is required for the communication with a serving cell, the frequency reuse factor is 1.

In the case of the exterior cell, when the cell schedules a user to a part of given band, the system capacity may be optimized for the case that neighboring cells do not transmit anything or the case that neighboring cells transmit low power to the users existed inside of adjacent cells in order to avoid strong interference that may occur for the user scheduled in the first cell.

Such a limitation brings about the result of increasing the frequency reuse rate in a cell-edge, which is known as the partial frequency reuse as shown in FIG. 1.

As shown in FIG. 1, each of the cells A, B and C may be divided into interior area and exterior area, and the frequency resource for each cell-edge is allocated to a cell in order not to be overlapped in an adjacent cell. In the case that a specific frequency resource is allocated to the exterior area of cell A, the corresponding frequency resource is not allocated in cell B and cell C. And in the case that a specific frequency resource is allocated to the exterior area of cell B, the corresponding frequency resource is not allocated in cell A and cell C. In the same way, in the case that a specific frequency resource is allocated to the exterior area of cell C, the corresponding frequency resource is not allocated in cell A and cell B.

In order to coordinate the scheduling for other cells in such a way, a communication is required between neighboring cells. In the case that the neighboring cells are managed by the same base station (e.g., eNodeB), the coordinated scheduling plan may be performed without request for a standardized signaling. However, in the case that the neighboring cells are managed by different base stations, particularly, in the multivendor networks, the standardized signaling is important.

In LTE, it is assumed that the Inter-Cell Interference Coordination (ICIC) is managed in the frequency domain, rather than in the time domain, and the signaling between base stations is designed for supporting it. This is because the time domain coordination may interfere with the operation for the HARQ process like the uplink in which the synchronous Hybrid Automatic Repeat reQuest (HARQ) is used.

Regarding a downlink transmission, the bitmap expressed by a Relative Narrowband Transmit Power (RNTP) may be exchanged through an X2 interface. Each bit of an RNTP indicator that corresponds to a single resource block in the frequency domain is used for notifying whether to maintain the transmission power for the resource block below a specific upper limit to neighboring base stations. Such an upper limit and the term of validity may be preconfigured.

For example, when the RNTP indicator is 1, which represents a state that the transmission power is maintained to a specific resource block, that is, a signal transmission, and when the RNTP indicator is 0, which represents a state that a signal is not transmitted to the corresponding resource block, that is, a state that beamforming is not performed.

Accordingly, the degree of interference anticipated in each resource block may be considered when neighboring cells schedule a user in their own cells.

In the case that a base station receives the information that the transmission power of the resource block in a neighboring cell is high, the follow-up operation is not consistent. Accordingly, a certain degree of freedom is allowed for performing the scheduling algorithm. However, a typical operation may have a user in a cell-edge avoid scheduling for the resource block of which transmission power is high.

In the definition of an RNTP indicator, the transmission power per antenna port may be normalized by the maximum output power of a base station or a cell. This is because the cell that has small maximum output power owing to its small size may undergo greater interference than the cell that has great maximum output power that corresponds to the cell of which size is great.

The determination for the RNTP indicator may be performed by Equation 1.

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_nom}^{(p)}} \text{ is made} \end{cases}$$ [Equation 1]

Equation 1, $E_A(n_{PRB})$ represents the maximum intended energy per resource element (EPRE) of a UE-specific physical downlink shared channel (PDSCH) REs for an orthogonal frequency division multiplexing (OFDM) symbol that does not include a reference signal (RS) in the physical resource block for antenna port p during the next specific time duration, and $n_{PRB}$ represents the number of physical resource blocks. $n_{PRB}$ may have a value from 0 to $N_{RB}^{DL}-1$. $RNTP_{threshold}$ may have a value belonged to $\{-\infty, -11, -10, -9, -8, -7, -6, -5, -4, -3, -2, -1, 0, +1, +2, +3\}$ [dB] ($RNTP_{threshold} \in \{-\infty, -11, -10, -9, -8, -7, -6, -5, -4, -3, -2, -1, 0, +1, +2, +3\}$ [dB]).

In addition, in Equation 1, $E^{(p)}_{max\_nom}$ may be expressed as Equation 2.

$$E_{max\_nom}^{(p)} = \frac{P_{max}^{(p)} \cdot \frac{1}{\Delta f}}{N_{RB}^{DL} \cdot N_{SC}^{RB}}$$ [Equation 2]

In Equation 2, $\Delta f$ represents a subcarrier spacing, and $N_{RB}^{DL}$ represents a Downlink bandwidth configuration. And $N_{SC}^{RB}$ represents a resource block size in the frequency domain, expressed as the number of subcarriers.

According to Equation 1, the RNTP indicator becomes 0 when the energy $$\frac{E_A(n_{PRB})}{\left(E_{max\_nom}^{(p)}\right)}$$

of a normalized RE is equal or smaller than $RNTP_{threshold}$ which is preconfigured, and becomes 1 in the case that there is no rule in the upper limit of the energy $$\frac{E_A(n_{PRB})}{\left(E_{max\_nom}^{(p)}\right)}$$

of a normalized RE. That is, the RNTP indicator may become 1 when $$\frac{E_A(n_{PRB})}{E_{max\_nom}^{(p)}}$$

is greater than $RNTP_{threshold}$.

Meanwhile, in the system such as a Coordinated Multi-point (CoMP) communication between base stations, interference information is exchanged between the base stations, and a scheduling wireless device may be performed based on the information.

Figure 2:
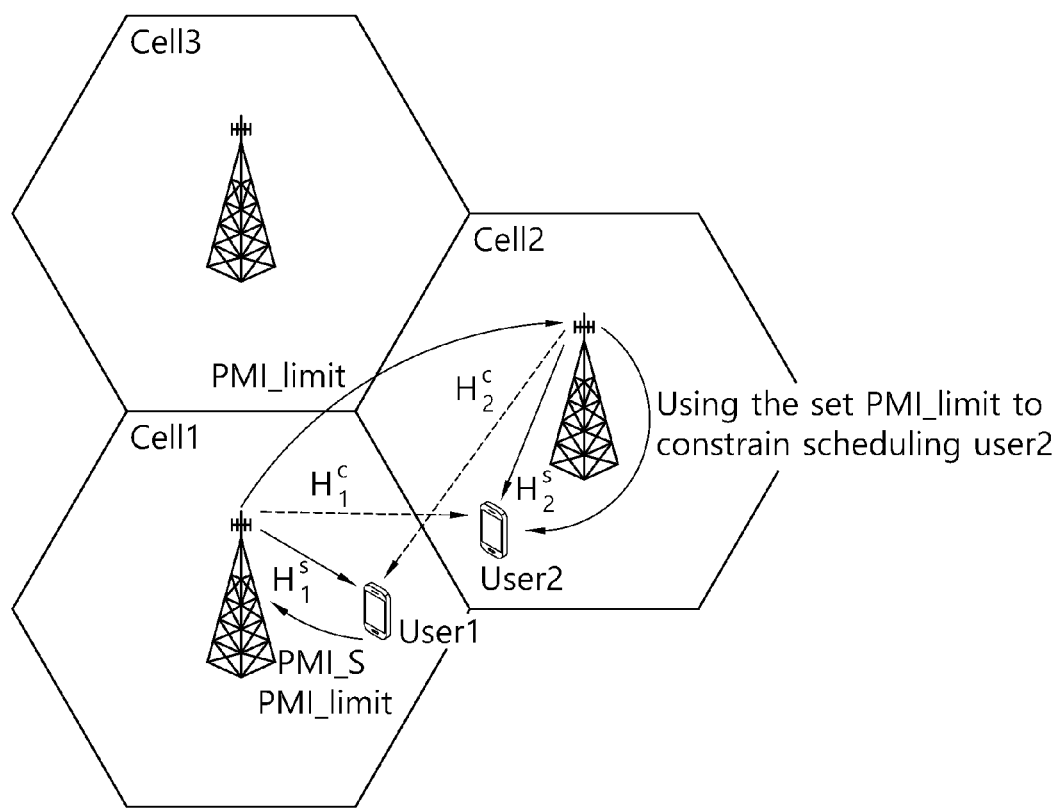
FIG. 2 is a diagram for describing a method for exchanging inter-cell information according to the conventional communication system.

FIG. 2 is a diagram for describing a method for exchanging inter-cell information according to the conventional communication system. FIG. 2 shows a method for generating user-specific interference control signal such as a coordinated beamforming.

As shown in FIG. 2, it is assumed that there exist three adjacent cells, and a wireless device in cell 1 may undergo interference by the signal generated in cell 2. In this case, it may be expressed that cell 2 generating an interference signal is an aggressor cell and cell 1 undergoing the interference is a victim cell.

A first wireless device (user 1) may transmit the feedback information for its own channel to a base station of cell 1. Such feedback information may include the feedback information (precoding matrix indicator (PMI_S)) for a signal received by it and the feedback information (PMI_limit) for the interference signal by cell 2.

The feedback information (PMI_limit) for the interference signal may be the PMI information for a signal that causes significant interference to a wireless device itself in the case that the information is used by a base station of an aggressor cell using a Channel Status Information-Reference Signal (CSI-RS) of the aggressor cell that causes the interference.

The base station of the victim cell that receives PMI_limit may forward the feedback information to the base station of the aggressor cell, and the base station in cell 2 may utilize the PMI_limit when scheduling wireless device 2 (user 2). For example, the base station in cell 2 may restrict the PMI specified by PMI_limit to be scheduled to wireless device 2.

Meanwhile, as shown in FIG. 2, the method of exchanging the inter-cell interference information may be operated only when the wireless device in the victim cell receives a CSI-RS, the method may not be applied to the case that the coverage mismatch occurs between the area in which the CSI-RS is stably received and the beamforming signal. When the massive MIMO is introduced, owing to the increase of the beam gain, the beam generated in the aggressor cell may deeply penetrate into the inside of the victim cell. In this case, since the coverage mismatch occurs between the CSI-RS that does not perform beamforming and the beamforming signal, an interference control method is required, which may be applied even in such a case.

In addition, the introduction of two-dimensional massive MIMO causes the increase of the number of PMIs for performing beamforming. The PMI in the conventional one-dimensional antenna array system has been utilized for representing a horizontal directing point. However, owing to the introduction of two-dimensional antenna array, the PMI representing a vertical directing point of a beam is required. In addition, in the massive MIMO, the PMI for representing different beam widths is additionally required. That is, in the case that the two-dimensional massive MIMO is introduced, the PMI should represent all of the horizontal and vertical directions and the beam width.

Meanwhile, there exists a problem that the PMI used for interference control is not distinguished from the PMIs used when transmitting a downlink transport signal. The increase of the number of PMIs used for the interference control means the increase of the amount of inter-cell interference exchange in a system that requires beamforming.

Particularly, in the case that the amount of backhaul is limited, it is required to decrease the amount of inter-cell information exchange in order to smoothly perform the inter-cell interference control.

In order to solve such problem, an aspect of the present invention proposes a method for defining the PMI set used when controlling interference separately, indicating the PMI set used when controlling interference by the base station of the victim cell to the base station of the aggressor cell, and anticipating whether its own interference is occurred and indicating it to a base station of a victim cell by the base station of the aggressor cell by using the PMI set for the interference control.

Since the PMI set used when controlling interference for exchanging inter-cell information between the victim cell and the aggressor cell may be changed according to the communication environment and the situation in which cells are arranged, the PMI set may be derived using a self organizing network technique.

The automatic neighbor relations (ANR) technique of the conventional 3GPP LTE is one of the SON techniques, and has been used for a base station to discover a neighboring base station. However, the conventional ANR technique has a restriction that the PMIs for interference control may not be generated through the information exchange between base stations.

Accordingly, similar to the method that a base station of an aggressor cell generates the inter-cell interference control information based on a precoding matrix indicator (PMI), according to an aspect of the present invention, a base station of an aggressor cell that causes interference may generate interference control information and forward it to a base station of a victim cell that undergoes the interference. Hereinafter, a method for generating an interference_PMI_set, which is a set of PMIs required for an aggressor cell to transmit the interference control information to a victim cell, will be described.

The characteristics of the interference_PMI_set according to an aspect of the present invention are as follows.

(1) iPMIs, which are constituent elements of an interference_PMI_set, may direct different directions in a vertical direction and a horizontal direction, respectively.

(2) iPMIs, which are elements of an interference_PMI_set, may have the same antenna gain. That is, the change of beam width and the antenna gain may not be expressed through iPMI.

(3) An interference_PMI_set may be generated by a base station of a victim cell, and may be transmitted to a base station of an aggressor cell. In the case that there is a plurality of interference_PMI_sets and the information of a plurality of interference_PMI_sets is shared between a base station of a victim cell and a base station of an aggressor cell, the base station of the victim cell may indicate the index information indicating one of a plurality of interference_PMI_sets to the base station of the aggressor cell. That is, the victim cell may select a specific interference_PMI_set according to the accuracy of the interference control that the victim cell wants and indicate it to the base station of the aggressor cell.

(4) The number of iPMIs belonged to an interference_PMI_set and the direction of iPMI may be determined by a base station of a victim cell. This may mean that the victim cell is a subject of a range or an amount for performing interference removal.

(5) An interference_PMI_set may be regenerated when a communication environment is changed due to newly built base station, a construction of a building, an increase of the number of wireless devices, and the like. As described above, a base station of a victim cell may have several sets of interference_PMI_sets. The period for regenerating each of the interference_PMI_sets may be very long, and may be a few seconds or more.

(6) In the case that the level of interference that a base station of a victim cell is going to control is changed depending on a time, the base station of the victim cell may notify different interference_PMI_sets to a base station of an aggressor cell depending on a time. The period of changing an interference_PMI_set may be faster than the period of generating interference_PMI_set.

(7) A base station of an aggressor cell may transmit a specific iPMI of an interference_PMI_set, and notify that a signal is transmitted to an area of the corresponding iPMI.

Figure 3:
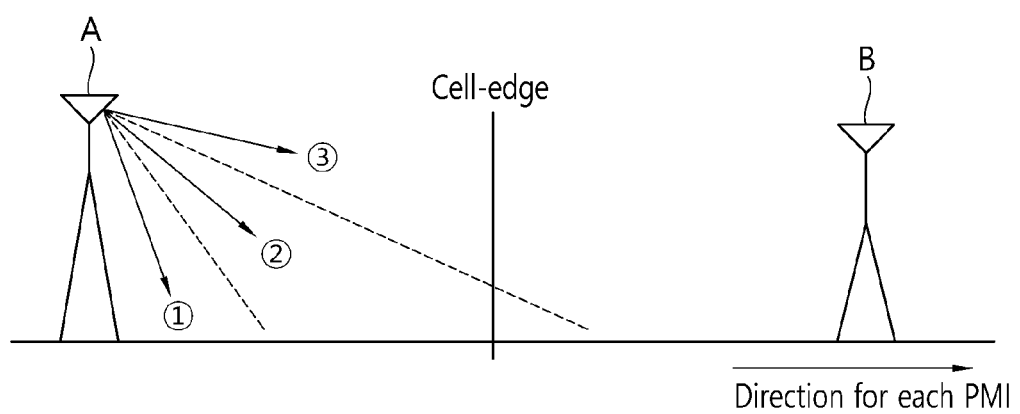
FIG. 3 is a diagram illustrating a PMI is classified in a vertical direction according to an aspect of the present invention.
Figure 4:
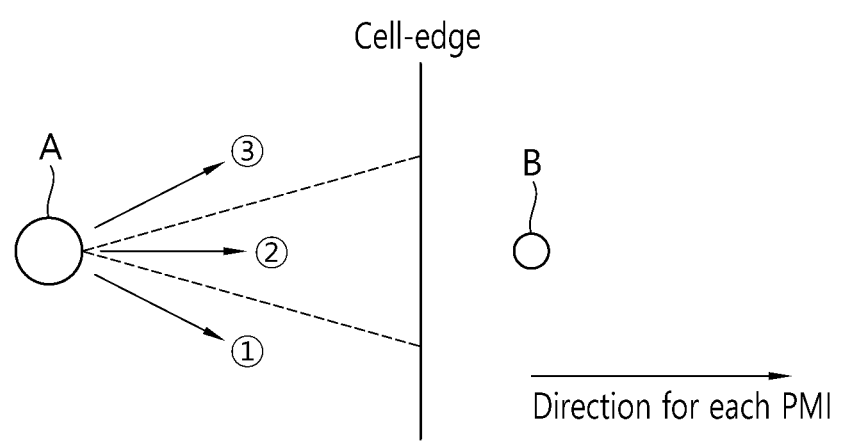
FIG. 4 is a diagram illustrating a PMI is divided in a horizontal direction according to an aspect of the present invention.

FIG. 3 is a diagram illustrating a PMI is classified in a vertical direction according to an aspect of the present invention, and FIG. 4 is a diagram illustrating a PMI is divided in a horizontal direction according to an aspect of the present invention.

Base station A of an aggressor cell is located in the left side of FIG. 3 and FIG. 4, and base station B of a victim cell is located in the right side of FIG. 3 and FIG. 4. In FIG. 3, a beam is divided into the vertical direction that the beams are directing, and in FIG. 4, a beam is divided into the horizontal direction that the beams are directing.

In the case that the beam is divided into three areas in the vertical direction as shown in FIG. 3, the iPMI may become three, and in the case that the beam is divided into three areas in the horizontal direction as shown in FIG. 4, the iPMI may also become three. Accordingly, in the case that an area of beam is divided as shown in FIG. 3 and FIG. 4, base station A may transmit the interference_PMI_set including total 9 iPMIs to base station B.

Otherwise, in the case that area ① is excluded in the vertical direction, there exist two areas in the vertical direction and three areas in the horizontal direction, that is, total six iPMIs.

In the case that base station A in the aggressor cell is scheduled to transmit a signal through area ③ in the vertical direction and area ② in the horizontal direction to the wireless device belonged to the base station A itself, base station A may transmit the iPMI indicating the corresponding area to base station B in the victim cell.

Figure 5:
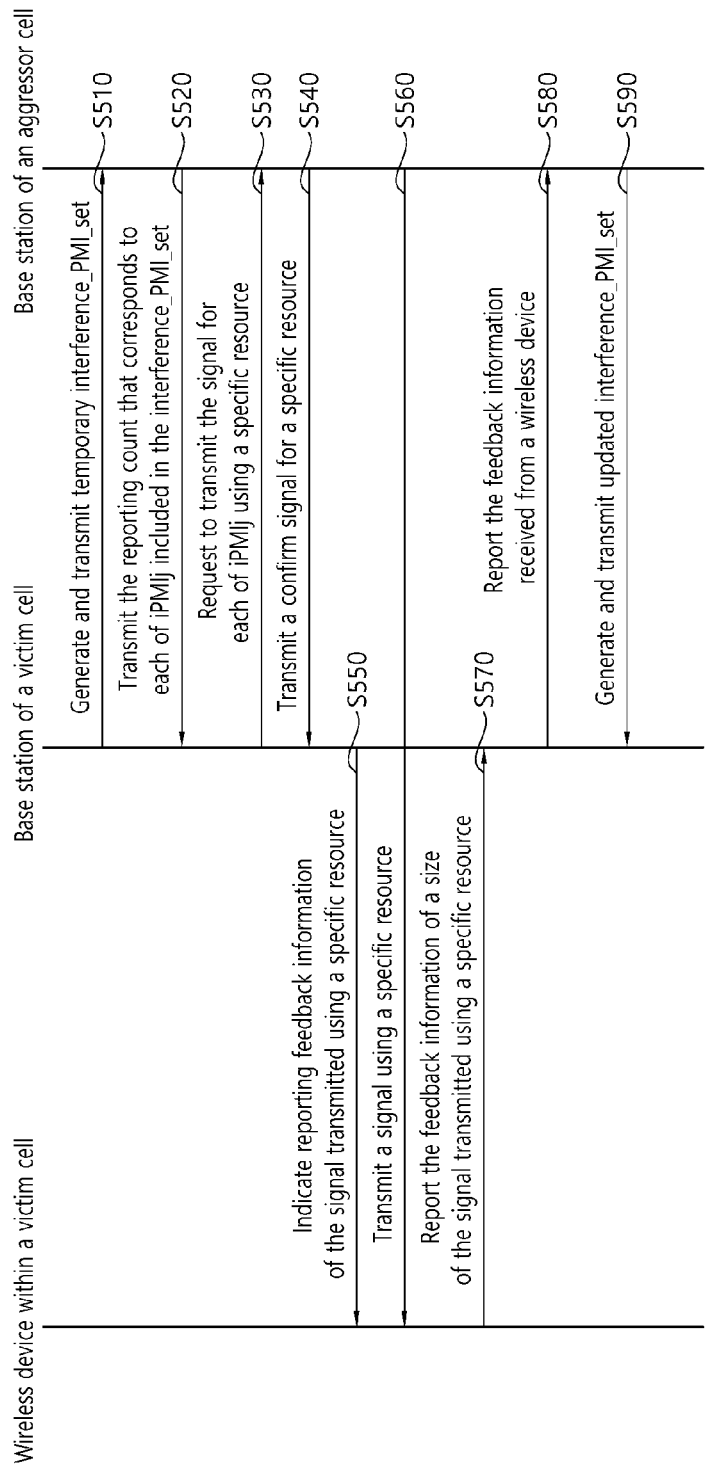
FIG. 5 is a control flowchart for describing a method for generating an interference_PMI_set according to an aspect of the present invention.

FIG. 5 is a control flowchart for describing a method for generating an interference_PMI_set according to an aspect of the present invention.

Firstly, in the case that a base station of a victim cell determines that it is required to generate a new interference_PMI_set, the base station of the victim cell generates an arbitrary interference_PMI_set={iPMI$_1$, iPMI$_2$, ... , iPMI$_L$} and forwards it to a base station of an aggressor cell (step, S510).

The interference_PMI_set may include the PMI quantized according to the horizontal and vertical directionality of the beam generated in the base station of the aggressor cell. That is, as shown in FIG. 3 and FIG. 4, the area in which the beam generated in the aggressor cell is transmitted may be divided into specific areas according to the direction, and the iPMIs included in the interference_PMI_set may be the values corresponding to the quantized areas according to the directionality as such.

The base station of the aggressor cell that receives an arbitrary interference_PMI_set transmits the reporting count that corresponds to iPMIj included in the interference_PMI_set (step, S520).

That is, the base station of the aggressor cell may notify how many reporting is required for each iPMIj included in the interference_PMI_set to the base station of the victim cell.

For example, in the case that the base station of the aggressor cell notifies that Nj times of reporting is required for iPMIj to the base station of the victim cell, the number of reporting that the base station of the victim cell should perform to the base station of the aggressor cell may be $$\left(N_{total} = \sum_{j=1}^{L} N_j\right).$$

Here, the number of reports that should be performed may correspond to the number of iPMIs included in the interference_PMI_set.

According to another example, the number of reporting that the base station of the victim cell should perform to the base station of the aggressor cell may be greater than the number of iPMI included in the interference_PMI_set. For example, in the case that the number of signals transmitted to a specific area shown in FIG. 3 and FIG. 4 of the base station of the aggressor cell is two or more, the information that should be given as a feedback corresponding to an area may be one or more. Accordingly, the number of reports that the base station of the victim cell should perform to the base station of the aggressor cell may be greater than the number of iPMI included in the interference_PMI_set.

In the case that the PMIs used by the base station of the aggressor cell are PMIi, when the set of PMI for transmitting to areas of iPMIj among the PMIs that the base station of the aggressor cell uses in a signal transmission is expressed as a PMI subset (PMI_subset(j)), the PMI subset may be expressed as Equation 3 below.

[Equation 3]

$$\text{PMI\_subset}(j) = \left\{ PMI_i \left| \begin{array}{l} V_{angle}(iPMI_j) - \frac{\Delta_v}{2} \le V_{angle}(PMI_i) < V_{angle}(iPMI_j) + \frac{\Delta_v}{2}, \\ H_{angle}(iPMI_j) - \frac{\Delta_h}{2} \le H_{angle}(PMI_i) < H_{angle}(iPMI_j) + \frac{\Delta_h}{2} \end{array} \right. \right\}$$

In Equation 3, $V_{angle}(PMI_i)$ represents a vertical directional angle of $PMI_i$ and $H_{angle}(PMI_i)$ represents a horizontal directional angle of $PMI_i$. And, $\Delta v$ and $\Delta h$ represent the quantization levels of PMI according to the vertical direction and the horizontal direction, respectively.

Since the base station of the aggressor cell may determine how many PMIs are included in the PMI subset among the PMIs that the base station itself uses, that is, for the area represented by quantized iPMIj, how many PMIs are actually used in the base station of the aggressor cell itself, the base station of the aggressor cell notifies the information of the number of reports that the victim cell should perform to the base station of the victim cell.

Later, the base station of the victim cell may request the base station of the aggressor cell to transmit the nj(1<n<N)$^{th}$ signal of iPMIj through a specific resource. That is, the base station of the aggressor cell may request to transmit the signal for each of iPMIj using a specific resource (step, S530).

Since the wireless device belonged to the victim cell may feedback a size of the signal only when the wireless device belonged to the victim cell is able to receive the specific signal to which a specific "PMI" is applied transmitted by the base station of the aggressor cell, the victim cell may request the resource information that is going to be allocated for a signal transmission to the base station of the aggressor cell.

That is, since a wireless device that may receive the signal transmitted from the base station of the aggressor cell should be existed in the victim cell and the base station of the victim cell may know the information of the wireless device, the base station of the victim cell may request to transmit a signal using a specific resource to the base station of the aggressor cell.

The victim cell may request to transmit the signals of Nj times for all iPMIj simultaneously. Otherwise, the victim cell may request a signal transmission distinguishably for each of iPMIj, or may also request to transmit a signal distinguishably for an iPMIj.

The base station of the victim cell may also request to transmit a signal using a PMI in a specific CSI-RS.

The base station of the aggressor cell that receives the resource request for a signal that is going to be transmitted may transmit a confirm signal indicating that a signal transmission is available through the corresponding resource to the base station of the victim cell (step, S540).

The base station of the victim cell that receives the confirm signal indicating transmitting a signal using a specific resource may notify the resource information for the signal transmitted by the base station of the aggressor cell to a certain wireless device within its own coverage, and may indicate to report the result of the signal, that is, the feedback information of the signal to the wireless device (step, S550).

That is, the base station of the aggressor cell may select one of the PMIs used in the area that corresponds to iPMIj and transmit it as the nj$^{th}$ signal, and in this case, the resource information used for transmitting the nj$^{th}$ signal may be forwarded to the wireless device that receives a signal by the base station of the victim cell.

The wireless device may know the quantization level for reporting the feedback information and the range of each quantization, and may receive the information of the quantization level and the range of each quantization together with the signal.

The base station of the aggressor cell may transmit the signal for one of the PIMs used in the area that corresponds to iPMIj using a specific resource (step, S560), and after receiving the signal, the wireless device in the victim cell may transmit the feedback information representing a size of interference signal to the its own base station (step, S570).

In this case, after receiving the signal that the base station of the aggressor cell transmits using PMIi, the wireless device belonged to the coverage of the victim cell may report the size of signal received based on the predetermined quantization level that the victim cell identifies or known in advance.

In order to express the signal size, a quantization level for a size of the signal may be configured, and the increase of the number of the quantization level may mean that the number of bits that may express the size of the signal is increased. When the number of bits increases, the signal may be expressed by dividing the size into several steps (by quantizing). That is, the quantization level may mean the step of dividing the signal size, and a base station may notify the information of the quantization level to a wireless device about how many steps the signal size is to be divided and reported by the wireless device.

When the quantization level is 2, the wireless device may represent whether the signal size is greater than a specific threshold value by '0' or '1'. When the quantization level is N, the wireless device may indicate in which position the size of the received signal is located between N−1 threshold values using $\log_2(N)$ bits.

The base station of the victim cell receives the signal reported by the wireless device, and indicates it to the base station in a neighboring aggressor cell (step, S580).

The base station of the victim cell may indicate the information of $\log_2(N)$ bits representing a size of an interference signal and the information representing that the corresponding signal is the feedback information of nj$^{th}$ signal among PMIs used in the area that corresponds to iPMIj to the base station of the aggressor cell.

Figure 6:
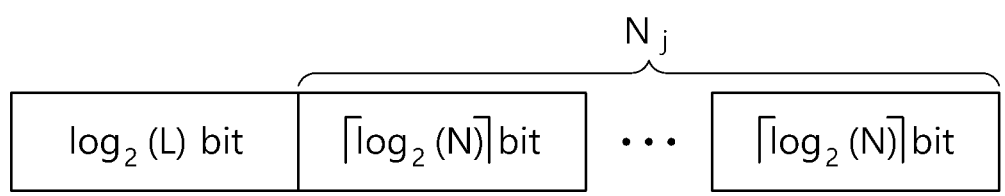
FIG. 6 illustrates an example of the feedback information that a base station of a victim cell transmits to a base station of an aggressor cell according to an aspect of the present invention.

FIG. 6 illustrates an example of the feedback information that a base station of a victim cell transmits to a base station of an aggressor cell according to an aspect of the present invention.

It is assumed that it is preconfigured to transmit the feedback information of PMI used in the area that corresponds to iPMIj between the base station of the victim cell and the base station of the aggressor cell Nj times sequentially and continuously.

Then, as shown in FIG. 6, the feedback information transmitted in the base station of the victim cell may include the information 610 indicating the order of iPMIj from the first position, and following it, may include Nj number of size information 620 of the signal transmitted from the base station of the aggressor cell, that is, the information of $\log_2(N)$ bits sequentially.

The base station of the aggressor cell that receives the $N_{total}$ feedback information from the base station of the victim cell may transmit the updated interference_PMI_set to the base station of the victim cell (step, S590).

The base station of the aggressor cell becomes to know the size of interference that the PMI transmitted by it exerts on a neighboring cell based on the signal received from the base station of the victim cell. In the case that the size of interference is small, the base station of the aggressor cell may remove the corresponding PMI from an arbitrary interference_PMI_set.

Otherwise, the base station of the aggressor cell may transmit a signal using the same PMI several times, and then, obtain a distribution of interference in the case of using the same PMI. And, by utilizing it, the base station of the aggressor cell may determine whether the corresponding PMI is included in the interference_PMI_set.

As such, the base station of the aggressor cell may determine the interference_PMI_set using the feedback information received from the base station of the victim cell, that is, may update an arbitrary interference_PMI_set.

In the case that the number of iPMIj included in the interference_PMI_set received from the base station of the aggressor cell is smaller than the number of arbitrary interference_PMI_sets, that is, the iPMIj less than the iPMIj originally intended are included in the interference_P-MI_set, the base station of the victim cell may subdivide a specific iPMIj.

For example, while 9 iPMIj were included in an arbitrary interference_PMI_set that the base station of the victim cell transmits to the base station of the aggressor cell firstly, three iPMIj may be excluded from the interference_PMI_set updated by reflecting the strength of interference signal by the base station of the aggressor cell. In this case, the base station of the victim cell may subdivide 6 iPMIj and newly configure the interference_PMI_set including 9 iPMIj.

Otherwise, instead of subdividing a specific iPMIj, the base station of the victim cell may update again all of the interference_PMI_sets.

For example, in the case that there are 7 elements in the interference_PMI_set, that is, the number of iPMIj transmitted from the base station of the aggressor cell, the base station of the victim cell may increase the number of iPMIj in the interference_PMI_set to 8 for the efficient information exchange. In this case, the base station of the victim cell may update the interference_PMI_set by subdividing a specific iPMIj, and then, notify the updated interference_PMI_set to the base station of the aggressor cell.

The base station of the aggressor cell may repeat the procedure from steps, S520 to S590 shown in FIG. 5 for the newly updated interference_PMI_sets by the base station of the victim cell.

Even in the case that a plurality of interference_PMI_sets is required, the base stations in the victim cell and the aggressor cell may configure the interference_PMI_set by repeating the procedure shown in FIG. 5.

In the case that it is required to generate the interference_PMI_set, that is, in the case that a base station is newly occurred or the occurrence of interference is measured, or in the case that a signal transmission environment is abruptly changed, the base stations in the victim cell may generate an interference_PMI_set as one of the SON techniques.

The advantages of using an interference_PMI_set according to an aspect of the present invention as the inter-cell information are as follows.

First, the amount of information that is going to be transmitted when controlling the inter-cell interference may be decreased.

A base station of an aggressor cell transmits one of iPMIs belonged to an interference_PMI_set to a base station of a victim cell, not the PMI transmitted when the base station of the aggressor cell sends a signal to a specific wireless device.

For example, assuming that the number of PMIs that the base station of the aggressor cell normally uses is 64 and the number of iPMIs of the interference_PMI_set is 6, 6 bits are required for the base station of the aggressor cell to transmit the PMI used by it to the base station of the victim cell as it is. However, in the case of utilizing the interference_PMI_set, it is available to express the PMI using 3 bits only.

Second, in comparison with the conventional interference control technique, the time required for sending an interference control signal is reduced. In the conventional technique, a wireless device in a victim cell measures the interference and forwards it to a base station in the victim cell belonged to the wireless device itself. And, the base station of the victim cell forwards again the corresponding signal to a base station of an aggressor cell.

However, in the proposed method, the base station of the aggressor cell transmits the PMI including the information of the interference signal to the base station of the victim cell, and accordingly, the steps of forwarding a signal may be decreased.

Third, even in the case that it is unable to anticipate interference due to the coverage mismatch between the CSI-RS of an interference signal and a beamforming signal owing to the introduction of the massive MIMO system, the interference may be anticipated utilizing the interference_PMI_set for a beam.

Fourth, using the interference_PMI_set, in the case that interference does not occur in a neighboring cell due to the shadowing, the problem of excessive interference estimation may be solved since the iPMI in the corresponding direction is not included in the interference_PMI_set.

For example, during the procedure of the beam generated in an aggressor cell being transmitted, the beam generated in an aggressor cell may not exert as an interference signal since the beam is blocked by a physical object such as a high building or a mountain. In this case, the iPMI for the area existed in the building or the mountain may not be included in the interference_PMI_set.

In addition, in an actual channel environment, even in the case that the base station of the aggressor cell sends a strong signal through beamforming, the size of the signal may be decreased in a receiver due to the shadowing, and the like. In the case that the base station of the aggressor cell anticipates interference using only the size of the signal transmitted by the base station itself, an excessive interference estimation may occur since the influence due to the shadowing is not considered.

However, by using the interference_PMI_set, in the case that the size of the signal is decreased due to the shadowing, and the like, the excessive interference estimation may be prevented by removing the iPMI for the corresponding signal in the interference_PMI_set in advance.

As such, when the interference_PMI_set is provided from a victim cell to an aggressor cell, the base station of the aggressor cell may forward the PMI information of the beam transmitted to the base station of the victim cell.

Figure 7:
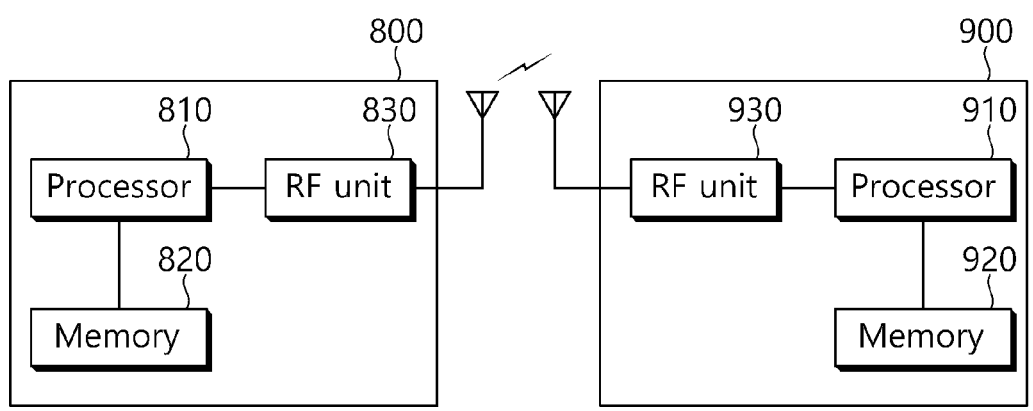
FIG. 7 is a block diagram illustrating a wireless communication system according to the present invention.

FIG. 7 is a block diagram of a wireless communication system according to an embodiment of the present invention.

The base station 800 includes a processor 810, a memory 820, and an RF (radio frequency) unit 830. The processor 810 implements functions, processes, and/or methods as suggested herein. The layers of a wireless interface protocol may be implemented by the processor 810. The memory 820 is connected with the processor 810 and stores various pieces of information for driving the processor 810. The RF unit 830 is connected with the processor 810 and transmits and/or receives radio signals.

The wireless device 900 includes a processor 910, a memory 920, and an RF unit 930. The processor 910 implements functions, processes, and/or methods as suggested herein. The layers of a wireless interface protocol may be implemented by the processor 910. The memory 920 is connected with the processor 910 and stores various pieces of information for driving the processor 910. The RF unit 930 is connected with the processor 910 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As described above, an aspect of the present invention proposes a method for exchanging information by utilizing the interference_PMI_set which is predefined to remove the inter-cell interference in a communication system in which a high beam gain is existed.

In the above embodiments, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method for transmitting and receiving inter-cell information for removing inter-cell interference, the method comprising:

receiving, by a base station of an aggressor cell, a first precoding matrix indicator (PMI) set, which is a set of PMIs of a signal corresponding to divided areas in a predetermined direction, from a base station of a victim cell;

transmitting, by the base station of the aggressor cell, a signal for a specific PMI included in the first PMI set to the victim cell using a specific resource, wherein feedback information for the signal for the specific PMI transmitted from a wireless device within the victim cell is received by the base station of the victim cell;

receiving, by the base station of the aggressor cell, the feedback information from the base station of the victim cell;

updating, by the base station of the aggressor cell, the first PMI set to a second PMI set based on the feedback information; and transmitting the updated second PMI set to the base station of the victim cell, wherein the feedback information includes first information on an order of transmission of the specific PMI among the first PMI set and second information on a size of interference of the signal for the specific PMI on the victim cell, and wherein the base station of the aggressor cell updates the second PMI set by deleting the specific PMI included in the first PMI set when the size of interference of the signal for the specific PMI on the victim cell is smaller than a predetermined threshold.

2. The method of claim 1, further comprising transmitting, by the aggressor cell that receives the first PMI set, information on a number of times to report the feedback information to the base station of the victim cell, wherein the number of times to report the feedback information is determined based on a number of PMIs corresponding to a signal transmitted to the divided areas by the base station of the aggressor cell.

3. The method of claim 1, further comprising receiving, by the base station of the aggressor cell, a request to transmit the signal for the PMI using the specific resource from the base station of the victim cell.

4. The method of claim 1, wherein the feedback information includes size information of a signal received by the wireless device within the victim cell.

5. The method of claim 1, wherein the feedback information includes size information of a signal received by the wireless device within the victim cell, and wherein the size information of the signal is generated based on a predetermined quantization level that quantizes a size of the signal.

6. The method of claim 1, wherein a PMI included in the second PMI set is subdivided by the base station of the victim cell to increase the number of PMIs in the second PMI set.

* * * * *